US012704247B2

(12) United States Patent
Pena

(10) Patent No.: US 12,704,247 B2
(45) Date of Patent: Aug. 11, 2026

(54) ILLUMINATED EARPIECE DEVICE

(71) Applicant: Rafael Pena, Westchester, IL (US)

(72) Inventor: Rafael Pena, Westchester, IL (US)

( * ) Notice: Subject to any disclaimer, the term of this patent is extended or adjusted under 35 U.S.C. 154(b) by 174 days.

(21) Appl. No.: 18/814,543

(22) Filed: Aug. 25, 2024

(65) Prior Publication Data

US 2026/0055888 A1 Feb. 26, 2026

(51) Int. Cl.

| | |
|---|---|
| ***F21V 33/00*** | (2006.01) |
| ***F21V 21/32*** | (2006.01) |
| ***F21V 23/02*** | (2006.01) |
| ***F21V 23/04*** | (2006.01) |
| ***F21V 23/06*** | (2006.01) |
| ***G06F 3/01*** | (2006.01) |
| ***G06V 40/20*** | (2022.01) |
| ***H04R 1/10*** | (2026.01) |

(52) U.S. Cl.

CPC .......... *F21V 33/0056* (2013.01); *F21V 21/32* (2013.01); *F21V 23/023* (2013.01); *F21V 23/04* (2013.01); *F21V 23/06* (2013.01); *G06F 3/017* (2013.01); *G06V 40/28* (2022.01); *H04R 1/1008* (2013.01); *H04R 1/1041* (2013.01); *H04R 1/1075* (2013.01); *H04R 2201/107* (2013.01)

(58) Field of Classification Search

CPC .... F21V 33/0056; F21V 21/32; F21V 23/023; F21V 23/04; F21V 23/06; G06F 3/017; G06V 40/28; H04R 1/1008; H04R 1/1041; H04R 1/1075; H04R 2201/107; H04R 2420/07; H04R 1/1016; H04R 1/105

USPC ................. 381/74, 150, 172, 370, 381, 334; 455/569.1, 73; 396/153, 155, 429, 431, 396/434

See application file for complete search history.

(56) References Cited

U.S. PATENT DOCUMENTS

| | | | | | |
|---|---|---|---|---|---|
| 4,969,069 | A * | 11/1990 | Eichost | F21V 33/0052 | 362/253 |
| 5,083,246 | A * | 1/1992 | Lambert | G02B 23/125 | 362/544 |
| 5,608,794 | A * | 3/1997 | Larson | H04M 1/82 | 379/388.04 |
| 6,006,115 | A * | 12/1999 | Wingate | H04M 1/6033 | 379/430 |
| 6,637,910 | B1 | 10/2003 | Mehler | | |
| D494,296 | S | 8/2004 | Shiu | | |
| 10,382,851 | B1 | 8/2019 | Smith | | |
| 10,928,163 | B2 | 2/2021 | Zimmer | | |
| D1,005,259 | S | 11/2023 | Deng | | |
| 2002/0027777 | A1 | 3/2002 | Takasu | | |

(Continued)

FOREIGN PATENT DOCUMENTS

WO WO2014043179 3/2014

*Primary Examiner* — Vivian C Chin
*Assistant Examiner* — Con P Tran

(57) ABSTRACT

An illuminated earpiece device includes a personal electronic device in wireless communication with an extrinsic communication network thereby enabling the personal electronic device to place or receive phone calls. An earpiece has a housing and a first arm and the earpiece can be worn on the user's ear. The earpiece has a second arm extending forwardly from the housing. The earpiece is in wireless communication with the personal electronic device to enable to the user to place or receive the phone call via the earpiece. A light unit is removably attachable to the second arm to illuminate a darkened area when the user is wearing the earpiece.

9 Claims, 7 Drawing Sheets

(56) References Cited

U.S. PATENT DOCUMENTS

2003/0202341 A1* 10/2003 McClanahan ........ H04R 1/1083 362/105
2004/0136178 A1 7/2004 Yu
2005/0175170 A1* 8/2005 Winegar ................ H04M 1/05 379/430
2007/0223215 A1 9/2007 Chou

* cited by examiner

ILLUMINATED EARPIECE DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to earpiece devices and more particularly pertains to a new earpiece device for enabling a user to illuminate a darkened area while wearing an earpiece that can be employed for placing or receiving a phone call. The device includes a personal electronic device that an earpiece that is in wireless communication with the personal electronic device to either place or receive a phone call. The device includes a light unit that is removably attachable to the ear piece and which emits light when the light unit is turned on for illuminating a darkened area in a hands-free manner for the user.

(2) Description of Related Art Including Information Disclosed Under 37 CFR 1.97 and 1.98

The prior art relates to earpiece devices including a variety of earpiece devices that each at least includes an earpiece and a light that is affixed to the earpiece for illuminating a darkened area in a hands-free manner for a user when the user is wearing the earpiece. In no instance does the prior art disclose an earpiece device that includes an earpiece and a light that is removably attachable to the earpiece for illuminating a darkened area in a hands-free manner for a user when the user is wearing the earpiece.

BRIEF SUMMARY OF THE INVENTION

An embodiment of the disclosure meets the needs presented above by generally comprising a personal electronic device in wireless communication with an extrinsic communication network thereby enabling the personal electronic device to place or receive phone calls. An earpiece has a housing and a first arm and the earpiece can be worn on the user's ear. The earpiece has a second arm extending forwardly from the housing. The earpiece is in wireless communication with the personal electronic device to enable to the user to place or receive the phone call via the earpiece. A light unit is removably attachable to the second arm to illuminate a darkened area when the user is wearing the earpiece.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
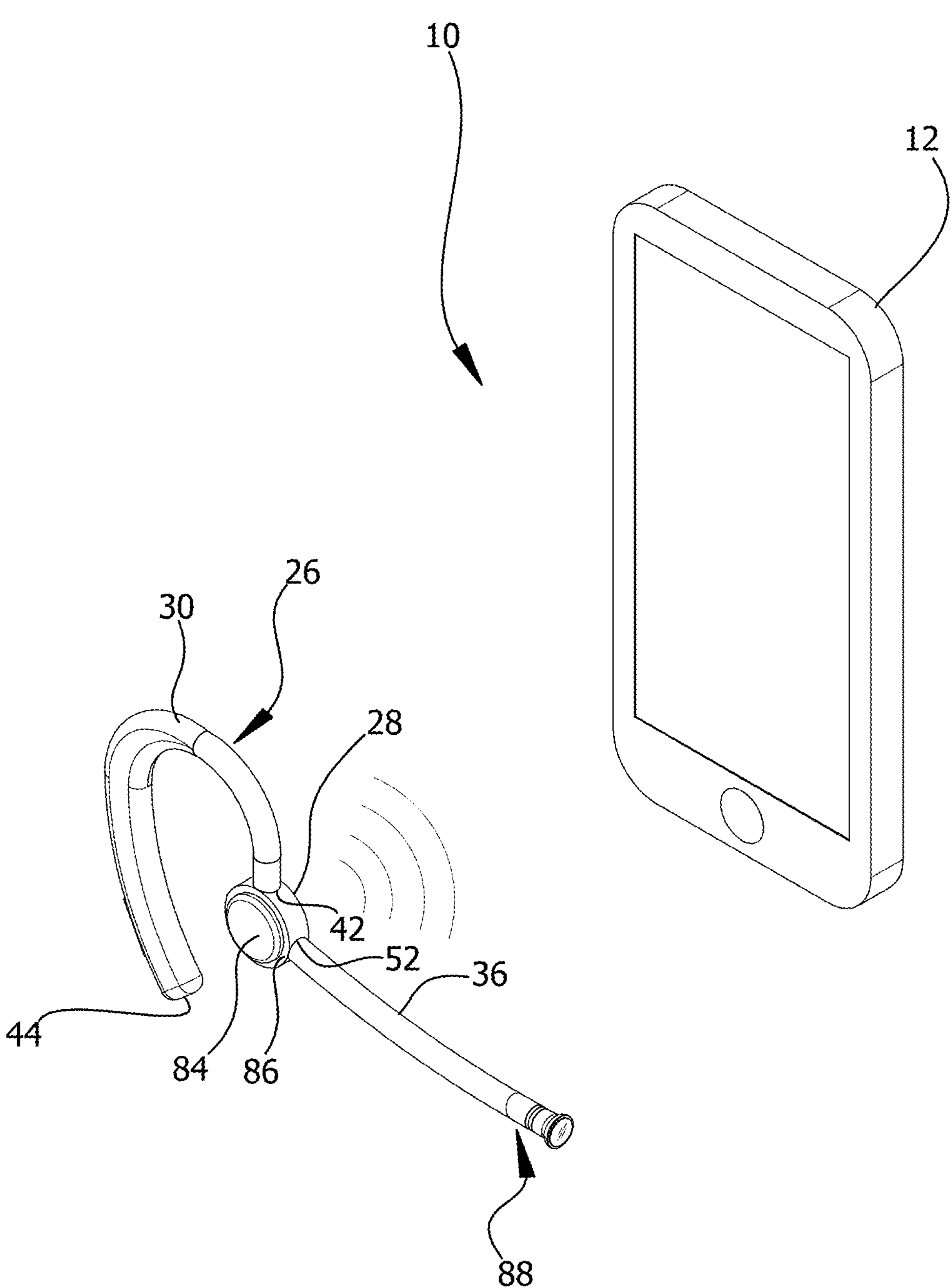
FIG. 1 is a perspective view of an illuminated earpiece device according to an embodiment of the disclosure.
Figure 2:
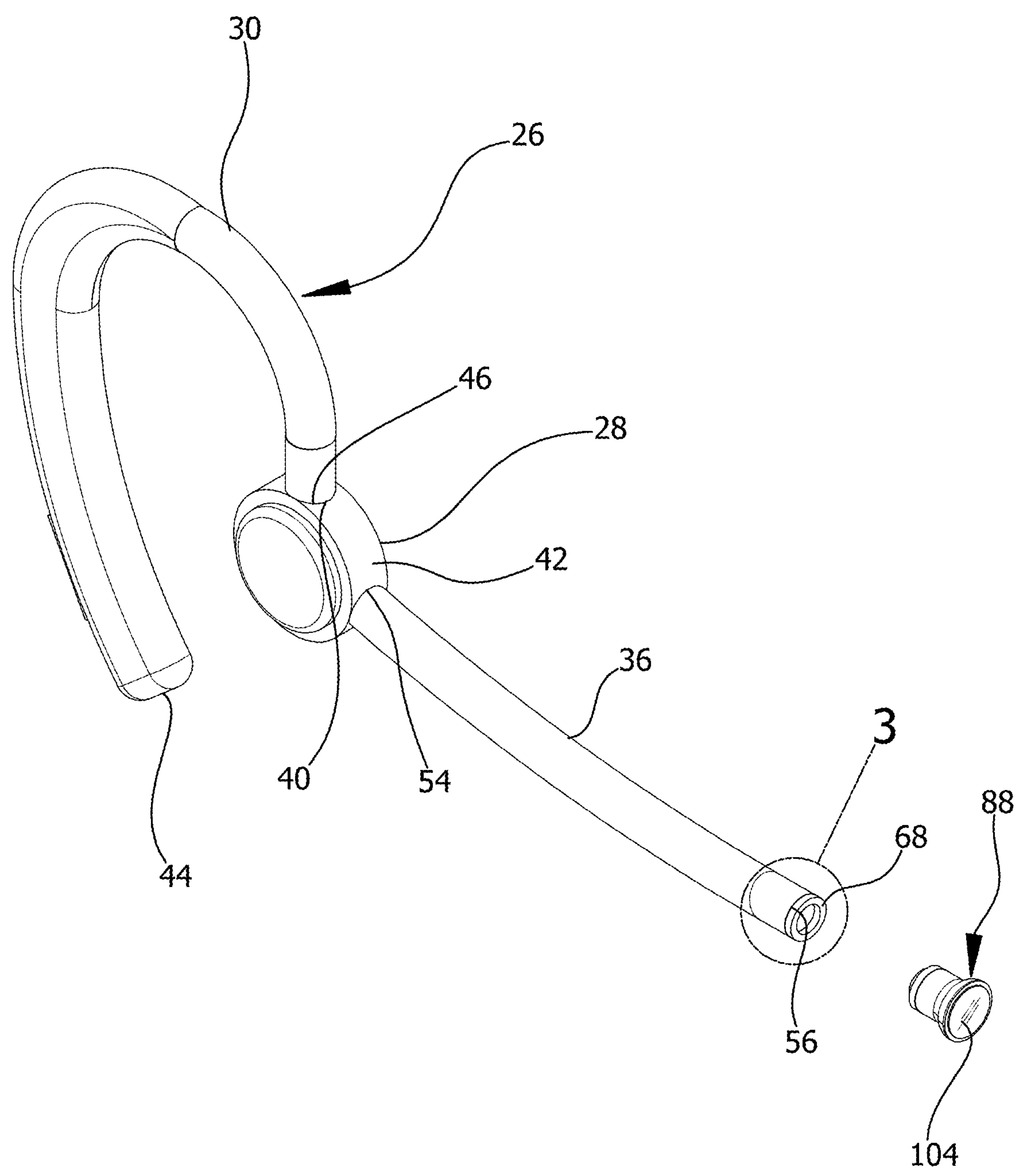
FIG. 2 is a perspective view of an embodiment of the disclosure showing a light unit being removed from an earpiece.
Figure 3:
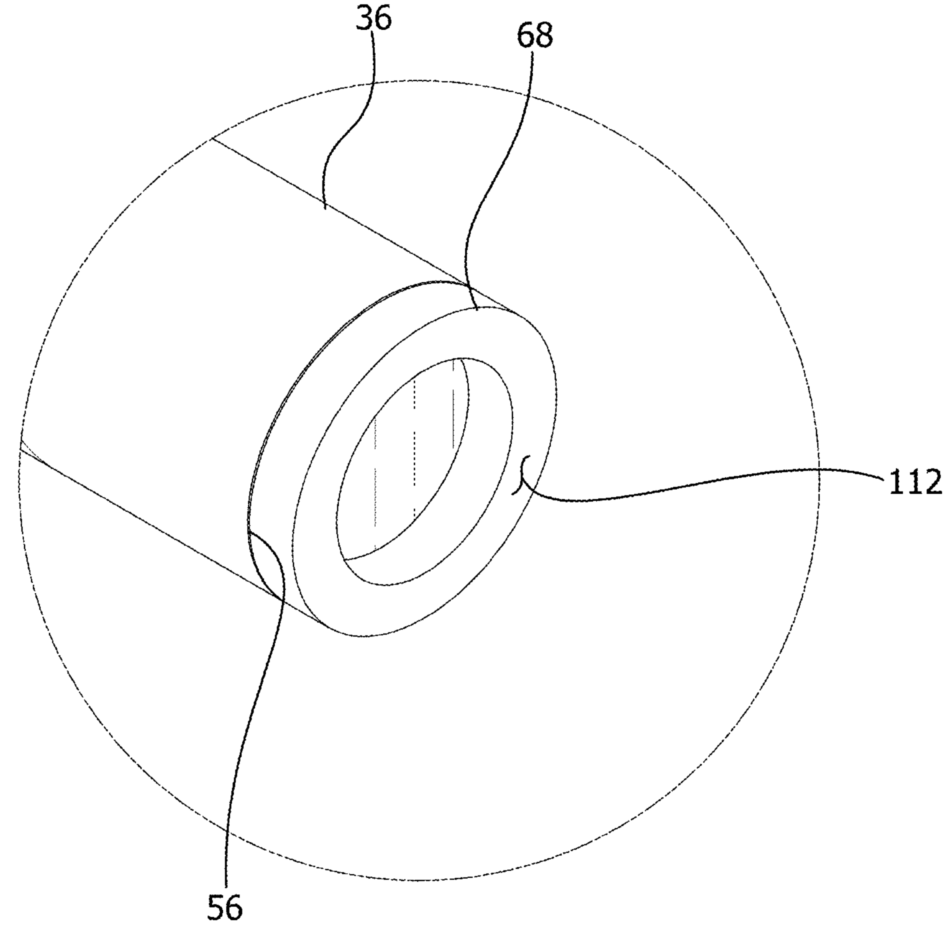
FIG. 3 is a magnified detail view taken from circle 3 of FIG. 2 of an embodiment of the disclosure.
Figure 4:
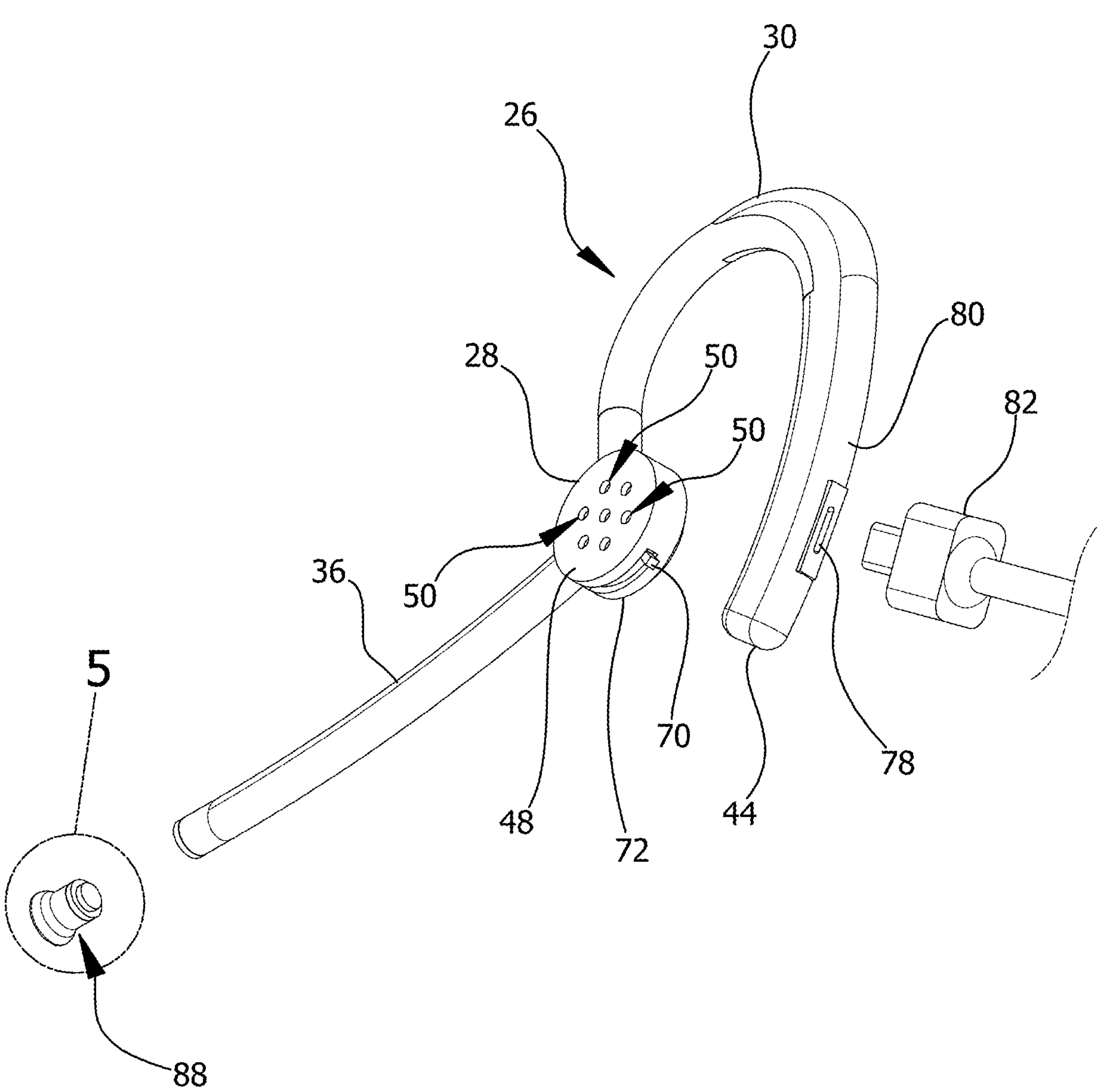
FIG. 4 is an exploded perspective view of an embodiment of the disclosure.
Figure 5:
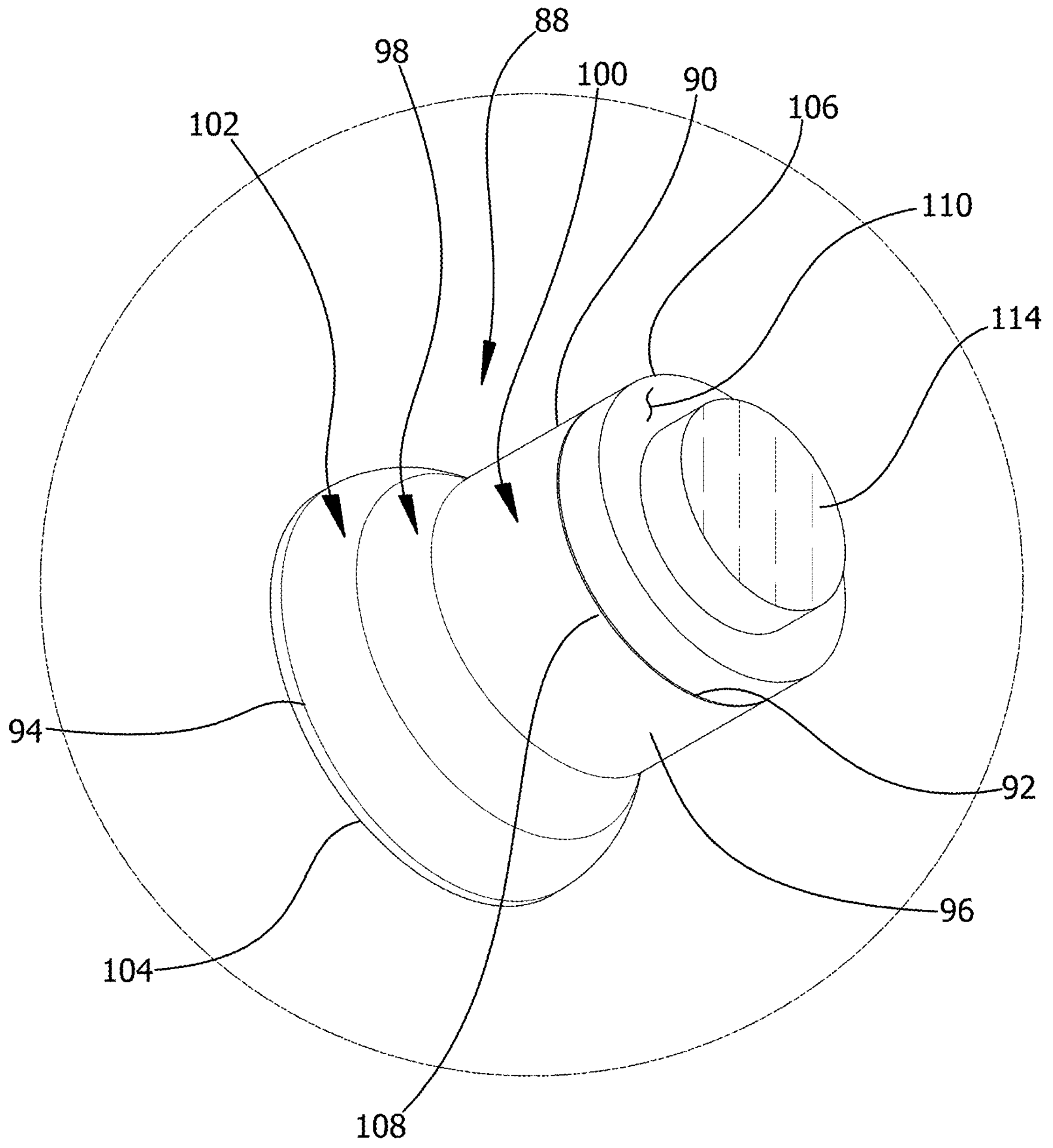
FIG. 5 is a magnified detail view taken from circle 5 of FIG. 4 of an embodiment of the disclosure.
Figure 6:
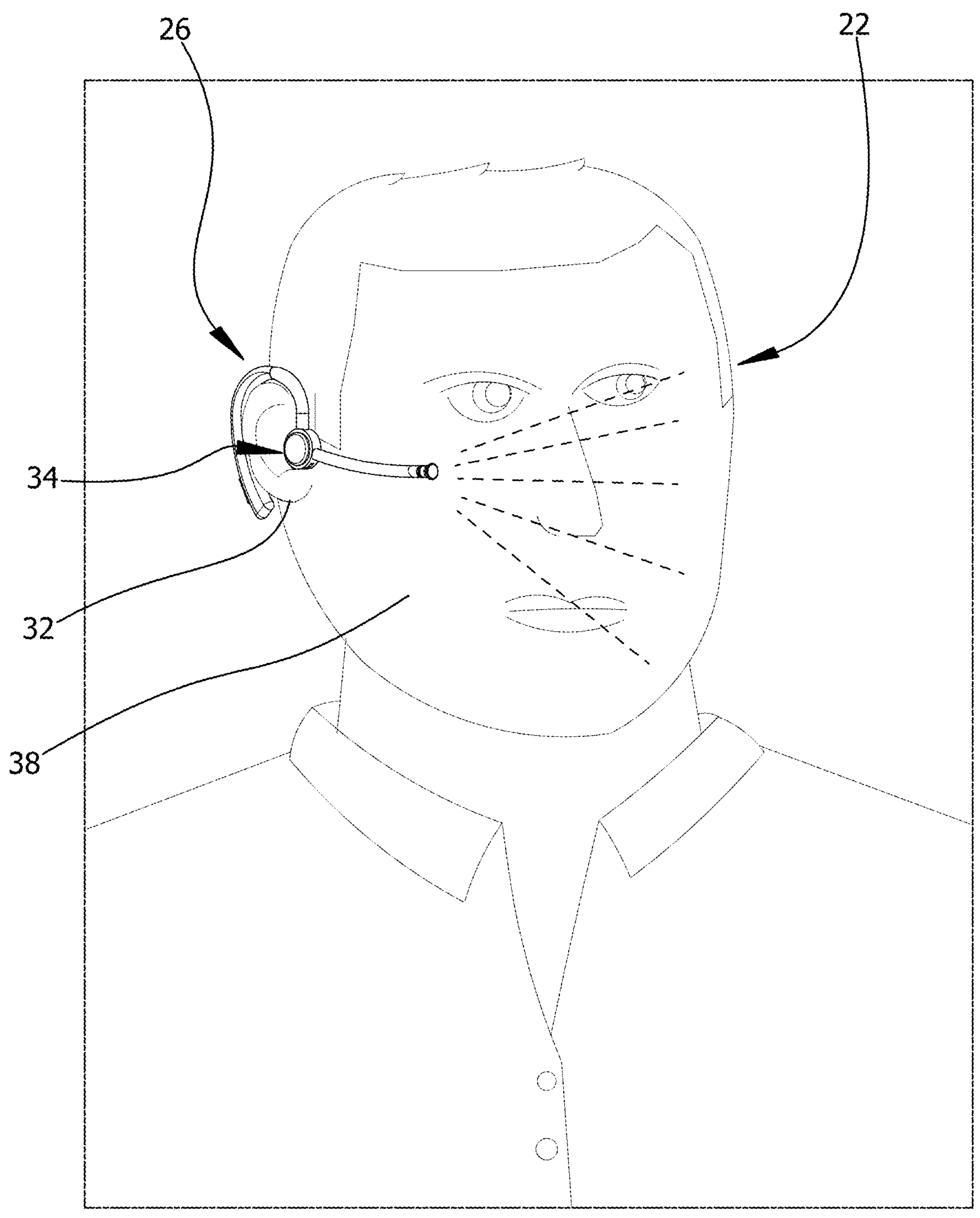
FIG. 6 is a perspective in-use view of an embodiment of the disclosure.
Figure 7:
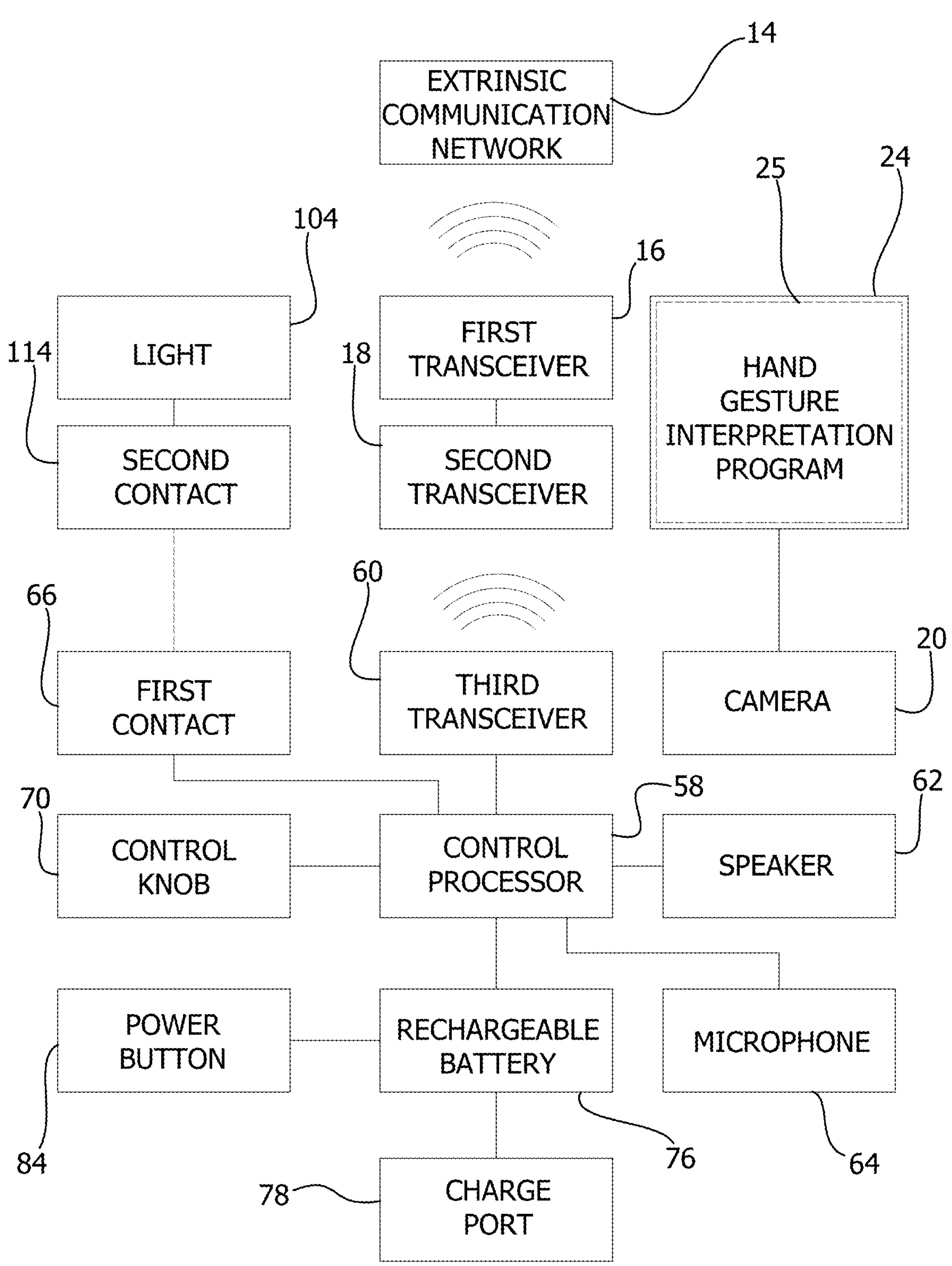
FIG. 7 is a schematic view of an embodiment of the disclosure.

With reference now to the drawings, and in particular to FIGS. 1 through 7 thereof, a new earpiece device embodying the principles and concepts of an embodiment of the disclosure and generally designated by the reference numeral 10 will be described.

As best illustrated in FIGS. 1 through 7, the illuminated earpiece device 10 generally comprises a personal electronic device 12 which is in wireless communication with an extrinsic communication network 14 thereby enabling the personal electronic device 12 to place or receive phone calls. The personal electronic device 12 includes a first transceiver 16 which is in wireless communication with the extrinsic communication network 14. The first transceiver 16 may comprise a radio frequency transceiver or the like and the first transceiver 16 may employ cellular phone communication protocols. The personal electronic device 12 includes a second transceiver 18 which is in communication with the first transceiver 16. The second transceiver 18 may comprise a radio frequency transceiver or the like and the second transceiver 18 may employ Bluetooth communication protocols. The extrinsic communication network 14 may comprise a cellular phone network, the internet or other type of wireless, global communication network.

The personal electronic device 12 includes a camera 20 which can detect hand gestures of a user 22. The camera 20 is in communication with the second transceiver 18 thereby enabling the second transceiver 18 to broadcast an actuate command when the camera 20 detects a specific hand gesture. In this way the second transceiver 18 can broadcast the actuate command in response to the hand gestures of the user 22. The personal electronic device 12 includes an electronic memory 24 which stores a database comprising a hand gesture interpretation program 25 thereby enabling the hand gestures of the user 22 to be interpreted by the hand gesture interpretation program 25. Furthermore, the personal electronic device 12 may comprise a smartphone or other similar type of electronic device that is commonly employed to place or receive phone calls.

An earpiece 26 is provided which has a housing 28 and a first arm 30 which is attached to and curves rearwardly and downwardly from the housing 28. The earpiece 26 can be worn on the user's ear 32 having the housing 28 being positioned in an opening 34 of the user's ear 32 and having the first arm 30 curving around the back of the user's ear 32 for retaining the housing 28 in the opening 34 of the user's ear 32. The earpiece 26 has a second arm 36 extending forwardly from the housing 28 thereby enabling the second arm 36 to extend along the user's cheek 38 when the user 22 is wearing the earpiece 26. Furthermore, the earpiece 26 is in wireless communication with the personal electronic device 12 such that the earpiece 26 enables to the user 22 to place or receive the phone call via the earpiece 26.

The first arm 30 has a first end 40 which is coupled to an outer wall 42 of the housing 28 and a second end 44 which is distal with respect to the outer wall 42. The first arm 30 is curved between the first end 40 and the second end 44 such that the first arm 30 defines an open loop. Additionally, the first end 40 is positioned on a top side 46 of the outer wall 42 such that the first arm 30 curves behind the outer wall 42 having the second end 44 being positioned below the housing 28. The housing 28 has a first lateral wall 48 which has a plurality of sound holes 50 each extending through the first lateral wall 48 and into an interior of the housing 28. The plurality of sound holes 50 can pass sound through the first lateral wall 48 of the housing 28 having the first lateral wall 48 being directed toward the opening 34 of the user's ear 32. The second arm 36 has a primary end 52 which is coupled to the outer wall 42 of the housing 28 and the primary end 52 is located on a front side 54 of the outer wall 42. The second arm 36 has a secondary end 56 which is open. Additionally, the second arm 36 is comprised of a resiliently flexible material to enable to user 22 to bend the second arm 36 into a preferred orientation for the user 22.

A control processor 58 is positioned in the earpiece 26 and the control processor 58 receives a light input. A third transceiver 60 is positioned in the earpiece 26 and the third transceiver 60 is electrically coupled to the control processor 58. Additionally, the third transceiver 60 is in wireless communication with the second transceiver 18 thereby enabling the third transceiver 60 to be in wireless communication with the extrinsic communication network 14. The third transceiver 60 receives the actuate command from the second transceiver 18 and the control processor 58 receives the light input when the third transceiver 60 receives the actuate command. The third transceiver 60 may comprise a radio frequency transceiver or the like and the third transceiver 60 may employ Bluetooth communication protocols.

A speaker 62 is positioned in the earpiece 26 to emit audible sounds outwardly through the plurality of sound holes 50 in the first lateral wall 48 of the housing 28. The speaker 62 is electrically coupled to the control processor 58 thereby enabling the speaker 62 to receive a signal from the extrinsic communication network 14 via the third transceiver 60. In this way the speaker 62 enables the user 22 to hear a voice of a person associated with the phone call. A microphone 64 is integrated into the housing 28 thereby enabling the microphone 64 to detect audible sounds. The microphone 64 is electrically coupled to the control processor 58 thereby enabling the microphone 64 to broadcast a signal to the extrinsic communication network 14 via the third transceiver 60. In this way the microphone 64 enables the user 22 to speak to the person associated with the phone call.

A first contact 66 is positioned within the second arm 36 and the first contact 66 is spaced inwardly from the secondary end 56 of the second arm 36. The first contact 66 is electrically coupled to the control processor 58 and the first contact 66 is comprised of an electrically conductive material. An annular ring 68 extends around the second arm 36 and the annular ring 68 is aligned with the secondary end 56 of the second arm 36. Additionally, the annular ring 68 is comprised of a ferromagnetic material. A control knob 70 is slidably integrated into the outer wall 42 of the housing 28 thereby enabling the control knob 70 to be manipulated by the user 22. The control knob 70 is located on a bottom side 72 of the outer wall 42 and the control knob 70 is electrically coupled to the control processor 58. Additionally, the control knob 70 is slidable between a minimum position and a maximum position.

A power supply 74 is integrated into the housing 28 and the power supply 74 is electrically coupled to the control processor 58. The power supply 74 comprises a rechargeable battery 76 that is positioned within the housing 28 and the rechargeable battery 76 is electrically coupled to the control processor 58. The power supply 74 includes a charge port 78 which is recessed into a rear side 80 of the first arm 30 thereby enabling the charge port 78 to insertably receive a charge cord 82 to charge the rechargeable battery 76. The charge port 78 is positioned closer to the second end 44 of the first arm 30 than the first end 40 of the first arm 30. Additionally, the charge port 78 may comprise a universal serial bus port or other type of charge port 78 commonly associated with rechargeable electronic devices. The power supply 74 includes a power button 84 which is movably integrated into a second lateral wall 86 of the housing 28 thereby enabling the power button 84 to be manipulated by the user 22 when the user 22 is wearing the earpiece 26. The control processor 58 is turned on when the power button 84 is depressed a first time and the control processor 58 is turned off when the power button 84 is depressed a second time.

A light unit 88 is removably attachable to the second arm 36 to emit light 104 outwardly from the second arm 36 when the light unit 88 is turned on. In this way the light unit 88 can illuminate a darkened area to enable the user 22 to see in the darkened area. The light unit 88 is placed in communication with the control knob 70 when the light unit 88 is attached to the second arm 36 thereby enabling the control knob 70 to adjust an operational intensity of the light unit 88 between a minimum intensity and a maximum intensity. In this way the control knob 70 can enable the user 22 to adjust a brightness of the light 104 emitted by the light unit 88. The minimum intensity may be an intensity of approximately 200.0 lumens and the maximum intensity may be an intensity of approximately 1000.0 lumens.

The light unit 88 comprises a light housing 90 which has a rear end 92 and a front end 94 and an exterior wall 96 extending between the rear end 92 and the front end 94. The exterior wall 96 is continuously arcuate about and axis extending between the front end 94 and the rear end 92 such that the light housing 90 has a cylindrical shape. The exterior wall 96 has a middle portion 98 angling outwardly between a rear portion 100 and a front portion 102 such that the front portion 102 has a diameter which is greater than a diameter of the rear portion 100. The front portion 102 is associated with the front end 94 and the rear portion 100 is associated with the rear end 92. Additionally, the light housing 90 is insertable into the secondary end 56 of the second arm 36 having the rear end 92 being positioned within the second arm 36.

The light unit 88 includes a light 104 which is attached to the front end 94 of the light housing 90. The light 104 emits light outwardly from the front end 94 when the light 104 is turned on. The light 104 may comprise a light emitting diode or other type of electronic light emitter. The light unit 88 includes a magnet 106 which has a first surface 108 that is attached to the rear end 92 of the light housing 90. A second surface 110 of the magnet 106 magnetically engages an exposed surface 112 of the annular ring 68 with respect to the secondary end 56 of the second arm 36 when the light housing 90 is inserted into the secondary end 56 of the second arm 36 thereby removably retaining the light housing 90 in the secondary end 56.

The light unit 88 includes a second contact 114 which is attached to the second surface 110 of the magnet 106 and the second contact 114 is centrally located on the second surface 110. The second contact 114 has a diameter which is less than a diameter of the annular ring 68 on the second arm 36 thereby enabling the second contact 114 to abut the first contact 66 when the light housing 90 is inserted into the secondary end 56 of the second arm 36. The second contact 114 is electrically coupled to the light 104 and the second contact 114 is comprised of an electrically conductive material thereby enabling the second contact 114 to be in electrical communication with the first contact 66 when the light housing 90 is inserted into the secondary end 56 of the second arm 36.

In use, the earpiece 26 is worn on the user's ear 32 to enable the user 22 to employ the earpiece 26 to place or receive a phone call via the personal electronic device 12. The light unit 88 is inserted into the secondary end 56 of the second arm 36 when the user 22 wishes to illuminate a darkened area. The light unit 88 can be actuated either by depressing the power button 84 or by performing the specific hand gesture over the personal electronic device 12. In this way the light 104 is actuated to emit light. Additionally, the intensity of the light emitted by the light 104 can be adjusted between the minimum intensity or the maximum intensity with the control knob 70.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated earpiece device which emits light to facilitate hands-free illumination of an area for a user, said device comprising:

a personal electronic device being in wireless communication with an extrinsic communication network thereby enabling said personal electronic device to place or receive phone calls;

an earpiece having a housing and a first arm being attached to and curving rearwardly and downwardly from said housing wherein said earpiece is configured to be worn on the user's ear having said housing being positioned in an opening of the user's ear and having said first arm curving around the back of the user's ear for retaining said housing in the opening of the user's ear, said earpiece having a second arm extending forwardly from said housing wherein said second arm is configured to extend along the user's cheek when the user is wearing said earpiece, said earpiece being in wireless communication with said personal electronic device wherein said earpiece is configured to enable to the user to place or receive the phone call via said earpiece;

a control knob being slidably integrated into said housing wherein said control knob is configured to be manipulated by the user, said control knob being slidable between a minimum position and a maximum position; and a light unit being removably attachable to said second arm wherein said light unit is configured to emit light outwardly from said second arm when said light unit is turned on to illuminate a darkened area to enable the user to see the darkened area, said light unit being placed in communication with said control knob when said light unit is attached to said second arm thereby enabling said control knob to adjust an operational intensity of said light unit between a minimum intensity and a maximum intensity wherein said control knob is configured to enable the user to adjust a brightness of the light emitted by said light unit.

2. The device according to claim 1, wherein:

said first arm has a first end being coupled to an outer wall of said housing and a second end being distal with respect to said outer wall;

said first arm is curved between said first end and said second end such that said first arm defines an open loop;

said first end being positioned on a top side of said outer wall such that said first arm curves behind said outer wall having said second end being positioned below said housing;

said housing has a first lateral wall which has a plurality of sound holes each extending through said first lateral wall an into an interior of said housing wherein said plurality of sound holes is configured to pass sound through said first lateral wall of said housing having said first lateral wall being directed toward the opening of the user's ear;

said second arm has a primary end being coupled to said outer wall of said housing;

said primary end is located on a front side of said outer wall;

said second arm has a secondary end being open; and said second arm is comprised of a resiliently flexible material wherein said second arm is configured to enable to user to bend said second arm into a preferred orientation for the user.

3. The device according to claim 1, wherein:

said personal electronic device includes a first transceiver being in wireless communication with said extrinsic communication network;

said personal electronic device includes a second transceiver;

said second transceiver is in communication with said first transceiver;

said personal electronic device includes a camera wherein said camera is configured to detect hand gestures of the user;

said camera is in communication with said second transceiver thereby enabling said second transceiver to broadcast an actuate command when said camera detects a specific hand gesture wherein said second transceiver is configured to respond to the hand gestures of the user;

said device includes a control processor being positioned in said earpiece;

said control processor receives a light input;

said device includes a third transceiver being positioned in said earpiece;

said third transceiver is electrically coupled to said control processor;

said third transceiver is in wireless communication with said second transceiver thereby enabling said third transceiver to be in wireless communication with said extrinsic communication network;

said third transceiver receives said actuate command from said second transceiver; and said control processor receives said light input when said third transceiver receives said actuate command.

4. The device according to claim 3, wherein:

said device includes a speaker being positioned in said earpiece wherein said speaker is configured to emit audible sounds outwardly through said plurality of sound holes in said first lateral wall of said housing;

said speaker is electrically coupled to said control processor thereby enabling said speaker to receive a signal from said extrinsic communication network via said third transceiver wherein said speaker is configured to enable the user to hear a voice of a person associated with the phone call;

said device includes a microphone being integrated into said housing wherein said microphone is configured to detect audible sounds; and said microphone is electrically coupled to said control processor thereby enabling said microphone to broadcast a signal to said extrinsic communication network via said third transceiver wherein said microphone is configured to enable the user to speak to the person associated with the phone call.

5. The device according to claim 1, wherein:

said device includes a control processor being positioned in said housing of said earpiece;

said second arm has a primary end and a secondary end;

said device includes a first contact being positioned within said second arm;

said first contact is spaced inwardly from said secondary end of said second arm;

said first contact is electrically coupled to said control processor;

said first contact is comprised of an electrically conductive material;

said device includes an annular ring extending around said second arm;

said annular ring is aligned with said secondary end of said second arm; and said annular ring is comprised of a ferromagnetic material.

6. The device according to claim 5, wherein:

said light unit includes a light housing having a front end and a rear end;

said light unit includes a light being attached to said front end of said light housing wherein said light is configured to emit light outwardly from said front end when said light is turned on;

said light unit includes a magnet having a first surface being attached to said rear end of said light housing;

a second surface of said magnet magnetically engages an exposed surface of said annular ring with respect to said secondary end of said second arm when said light housing is inserted into said secondary end of said second arm thereby removably retaining said light housing in said secondary end;

said light unit includes a second contact being attached to said second surface of said magnet;

said second contact is centrally located on said second surface;

said second contact has a diameter being less than a diameter of said annular ring on said second arm thereby enabling said second contact to abut said first contact when said light housing is inserted into said secondary end of said second arm;

said second contact is electrically coupled to said light; and said second contact is comprised of an electrically conductive material thereby enabling said second contact to be in electrical communication with said first contact when said light housing is inserted into said secondary end of said second arm.

7. The device according to claim 1, wherein:

said second arm has a primary end and a secondary end;

said secondary end is open;

said light unit includes a light housing having a rear end and a front end and an exterior wall extending between said rear end and said front end;

said exterior wall is continuously arcuate about and axis extending between said front end and said rear end such that said light housing has a cylindrical shape;

said exterior wall has a middle portion angling outwardly between a rear portion and a front portion such that said front portion has a diameter being greater than a diameter of said rear portion;

said front portion is associated with said front end;

said rear portion is associated with said rear end; and said light housing is insertable into said secondary end of said second arm having said rear end being positioned within said second arm.

8. The device according to claim 1, wherein:

said device includes a control processor being positioned in said housing;

said device includes a power supply being integrated into said housing;

said power supply is electrically coupled to said control processor; and said power supply comprises:

a rechargeable battery being positioned within said housing, said rechargeable battery being electrically coupled to said control processor;

a charge port being recessed into a rear side of said first arm thereby enabling said charge port to insertably receive a charge cord to charge said rechargeable battery, said charge port being positioned closer to said second end of said first arm than said first end of said first arm; and a power button being movably integrated into a second lateral wall of said housing wherein said power button is configured to be manipulated by the user when the user is wearing said earpiece, said control processor being turned on when said power button is depressed a first time, said control processor being turned off when said power button is depressed a second time.

9. An illuminated earpiece device which emits light to facilitate hands-free illumination of an area for a user, said device comprising:

a personal electronic device being in wireless communication with an extrinsic communication network thereby enabling said personal electronic device to place or receive phone calls, said personal electronic device including a first transceiver being in wireless communication with said extrinsic communication network, said personal electronic device including a second transceiver, said second transceiver being in communication with said first transceiver, said personal electronic device including a camera wherein said camera is configured to detect hand gestures of the user, said camera being in communication with said second transceiver thereby enabling said second transceiver to broadcast an actuate command when said camera detects a specific hand gesture wherein said second transceiver is configured to respond to the hand gestures of the user;

an earpiece having a housing and a first arm being attached to and curving rearwardly and downwardly from said housing wherein said earpiece is configured to be worn on the user's ear having said housing being positioned in an opening of the user's ear and having said first arm curving around the back of the user's ear for retaining said housing in the opening of the user's ear, said earpiece having a second arm extending forwardly from said housing wherein said second arm is configured to extend along the user's cheek when the user is wearing said earpiece, said earpiece being in wireless communication with said personal electronic device wherein said earpiece is configured to enable to the user to place or receive the phone call via said earpiece, said first arm having a first end being coupled to an outer wall of said housing and a second end being distal with respect to said outer wall, said first arm being curved between said first end and said second end such that said first arm defines an open loop, said first end being positioned on a top side of said outer wall such that said first arm curves behind said outer wall having said second end being positioned below said housing, said housing having a first lateral wall which has a plurality of sound holes each extending through said first lateral wall an into an interior of said housing wherein said plurality of sound holes is configured to pass sound through said first lateral wall of said housing having said first lateral wall being directed toward the opening of the user's ear, said second arm having a primary end being coupled to said outer wall of said housing, said primary end being located on a front side of said outer wall, said second arm having a secondary end being open, said second arm being comprised of a resiliently flexible material wherein said second arm is configured to enable the user to bend said second arm into a preferred orientation for the user;

a control processor being positioned in said earpiece, said control processor receiving a light input;

a third transceiver being positioned in said earpiece, said third transceiver being electrically coupled to said control processor, said third transceiver being in wireless communication with said second transceiver thereby enabling said third transceiver to be in wireless communication with said extrinsic communication network, said third transceiver receiving said actuate command from said second transceiver, said control processor receiving said light input when said third transceiver receives said actuate command;

a speaker being positioned in said earpiece wherein said speaker is configured to emit audible sounds outwardly through said plurality of sound holes in said first lateral wall of said housing, said speaker being electrically coupled to said control processor thereby enabling said speaker to receive a signal from said extrinsic communication network via said third transceiver wherein said speaker is configured to enable the user to hear a voice of a person associated with the phone call;

a microphone being integrated into said housing wherein said microphone is configured to detect audible sounds, said microphone being electrically coupled to said control processor thereby enabling said microphone to broadcast a signal to said extrinsic communication network via said third transceiver wherein said microphone is configured to enable the user to speak to the person associated with the phone call;

a first contact being positioned within said second arm, said first contact being spaced inwardly from said secondary end of said second arm, said first contact being electrically coupled to said control processor, said first contact being comprised of an electrically conductive material;

an annular ring extending around said second arm, said annular ring being aligned with said secondary end of said second arm, said annular ring being comprised of a ferromagnetic material;

a control knob being slidably integrated into said outer wall of said housing wherein said control knob is configured to be manipulated by the user, said control knob being located on a bottom side of said outer wall, said control knob being electrically coupled to said control processor, said control knob being slidable between a minimum position and a maximum position;

a power supply being integrated into said housing, said power supply being electrically coupled to said control processor, said power supply comprising:

a rechargeable battery being positioned within said housing, said rechargeable battery being electrically coupled to said control processor;

a charge port being recessed into a rear side of said first arm thereby enabling said charge port to insertably receive a charge cord to charge said rechargeable battery, said charge port being positioned closer to said second end of said first arm than said first end of said first arm; and a power button being movably integrated into a second lateral wall of said housing wherein said power button is configured to be manipulated by the user when the user is wearing said earpiece, said control processor being turned on when said power button is depressed a first time, said control processor being turned off when said power button is depressed a second time; and a light unit being removably attachable to said second arm wherein said light unit is configured to emit light outwardly from said second arm when said light unit is turned on to illuminate a darkened area to enable the user to see in the darkened area, said light unit being placed in communication with said control knob when said light unit is attached to said second arm thereby enabling said control knob to adjust an operational intensity of said light unit between a minimum intensity and a maximum intensity wherein said control knob is configured to enable the user to adjust a brightness of the light emitted by said light unit, said light unit comprising:

a light housing having a rear end and a front end and an exterior wall extending between said rear end and said front end, said exterior wall being continuously arcuate about and axis extending between said front end and said rear end such that said light housing has a cylindrical shape, said exterior wall having a middle portion angling outwardly between a rear portion and a front portion such that said front portion has a diameter being greater than a diameter of said rear portion, said front portion being associated with said front end, said rear portion being associated with said rear end, said light housing being insertable into said secondary end of said second arm having said rear end being positioned within said second arm;

a light being attached to said front end of said light housing wherein said light is configured to emit light outwardly from said front end when said light is turned on;

a magnet having a first surface being attached to said rear end of said light housing, a second surface of said magnet magnetically engaging an exposed surface of said annular ring with respect to said secondary end of said second arm when said light housing is inserted into said secondary end of said second arm thereby removably retaining said light housing in said secondary end; and a second contact being attached to said second surface of said magnet, said second contact being centrally located on said second surface, said second contact having a diameter being less than a diameter of said annular ring on said second arm thereby enabling said second contact to abut said first contact when said light housing is inserted into said secondary end of said second arm, said second contact being electrically coupled to said light, said second contact being comprised of an electrically conductive material thereby enabling said second contact to be in electrical communication with said first contact when said light housing is inserted into said secondary end of said second arm.

* * * * *